United States Patent [19]
Craft, III

[11] 3,786,947
[45] Jan. 22, 1974

[54] MOVABLE SHELF APPARATUS
[75] Inventor: James Pressley Craft, III, College Park, Ga.
[73] Assignee: The Coca-Cola Company, Atlanta, Ga.
[22] Filed: June 12, 1972
[21] Appl. No.: 261,851

[52] U.S. Cl.................. 214/75 R, 187/19, 296/3, 296/24 R
[51] Int. Cl............................ B60p 1/44, B65d 9/00
[58] Field of Search..... 214/75 R, 518; 296/3, 24 R; 187/17, 19, 8.59

[56] References Cited
UNITED STATES PATENTS

| 2,639,784 | 5/1953 | Strock | 187/17 |
| 670,466 | 3/1901 | Bolander | 187/17 |
| 2,410,628 | 11/1946 | Brunette | 187/17 X |
| 3,520,422 | 7/1970 | Bruce et al. | 214/6 P |
| 811,344 | 1/1906 | Wands | 187/8.59 X |
| 1,561,753 | 11/1925 | Swanner | 187/8.59 |
| 2,779,487 | 1/1957 | Harris | 214/75 R |

Primary Examiner—Albert J. Makay
Attorney, Agent, or Firm—William Dexter Brooks

[57] ABSTRACT

A movable shelf apparatus is described which is capable of being adjustably positioned within a bay of a truck or trailer body for article separation purposes and for supporting, handling, and transporting stacked articles during transit from manufacturing points to sales points. The movable shelf apparatus includes a shelf that is supported within the bay by four roller chains that are recessed within the divider bay walls of the truck or trailer body. The shelf is inclined towards the center of the truck or trailer body to minimize slippage of the articles during transit. The roller chains are driven by a rachet and gear arrangement that is positioned below the compartment floor line of the truck or trailer body so as not to interfere with the interior of the bays and any forklift pallet interface.

11 Claims, 3 Drawing Figures

PATENTED JAN 22 1974　　　3,786,947

MOVABLE SHELF APPARATUS

BACKGROUND OF INVENTION

The present invention relates to a movable shelf apparatus capable of being adjustably positioned within a truck or trailer body and more particularly, within a bay of those bodies especially suited for transporting stacked articles, such as cases of bottled beverages.

The transportation of cases of bottled beverages, such as milk, soft drinks, beer, wine and the like by a bottler from a bottling plant to a route distribution point has always been a time consuming and expensive operation. It has heretofore been practiced where these cases were delivered on bay-type delivery bodies or trailers, that pallets of the articles to be delivered were placed in a fixed location in the various bays. Usually at least one full bay along with either skirt or starter bays (not large enough to accommodate a pallet) were required to be left open to provide a place to store empty containers to be returned as the full cases were delivered. It was thought that as the first open bay became full of empty containers, enough full cases would have already been delivered to open up other bays for empty containers. These conventional truck or trailer bodies were found to be quite practical under those circumstances where distribution only involved (1) a limited number of different type or size articles, (2) a small volume of cases or (3) the return of a small number of empty containers. However, many difficulties were encountered under those circumstances where distribution involved (1) a plurality of different type or size articles, (2) a large volume of cases or (3) the return of a large number of empty containers. These difficulties were primarily due to the fact that as articles were delivered to the sales outlets, many of the stacks of articles were depleted simultaneously, and not one stack at a time. This resulted in storage space for empty containers not being readily available at a constant rate throughout the route day and the bottler was required to utilize one or more of the following solutions to minimize these difficulties:

1. The bottler would purchase a larger truck body so that more empty bays could go out on the delivery route. This not only increased the equipment costs, but decreased the maneuverability of the vehicle and thus was detrimental in metropolitan delivery operations.
2. As empty containers were encountered, they were placed on top of the articles remaining on the truck to be delivered, necessitating an inefficient shuffling of empty containers at subsequent delivery stops in order to deliver the articles beneath.
3. The articles to be delivered were periodically restacked and consolidated throughout the delivery day in order to provide sufficient storage space for empty containers on a pallet without interfering or blocking the other articles remaining on the truck to be delivered. Frequently, this restacking resulted in different types and sizes of articles being placed on top of one another, thus requiring a reshuffling of them at subsequent stops in order to locate the correct articles to be delivered.
4. Routes were run in an inefficient sequence and those stops normally having a great number of empty containers to be returned were scheduled towards the end of the day when fewer articles remained on the truck for delivery.
5. An additional empty vehicle was sent out to selected stops on the delivery route in order to reduce the number of empty containers to be picked up later by the article delivery vehicle itself. This also was a very costly procedure for the bottler to implement in his distribution operations.

Under practical circumstances, a combination of the above solutions were generally employed. All of the methods employed, however, resulted in a considerable expense because of increased time requirements for delivery routes and/or increased equipment expenditures.

These increased expenditures have become disastrous in recent years, since there has been a growing trend in the industry to shift compensation for the delivery salesman function from a base plus commission to an hourly basis. One result of this has been the equation of time and money in terms of route delivery. Thus, by decreasing the time requirement of route delivery, substantial monetary savings can be achieved. With the advent of preselling delivery, delivery routes now deliver more cases and consequently pick up more empty containers. The rehandling requirement on a fixed size body is exponentially proportional to the amount of cases delivered. Accordingly, new delivery methods compound the rehandling problems and consequently reduce delivery efficiencies, thereby resulting in additional expenditures of capital and labor.

Typically the restacking and reshuffling of cases to be delivered, as well as empty containers occur at the top of an article loaded pallet. The deliveryman is frequently required to handle 60 pound cases at arms length and in many cases, while being in a suspended position alongside the truck or trailer body. This rehandling requirement is not only time consuming but also very fatiguing to the deliveryman.

Recently, with the influx of a plurality of different sized returnable packages, it has become a common practice to sort the empty containers by size before returning to the plant. This has resulted in as many as four different sizes of empty containers being picked up at the first and second delivery stops, while there exists at most only one or two empty pallets on the truck on which to separate and store the returnable packages. This practice requires considerable restacking of empty containers throughout the route day in order to separate the four sizes of empty containers on the separate pallets as they become available. In addition to this restacking practice being very time consuming, it is an inefficient distribution maneuver for a bottler to institute.

Another practice is to column stack the articles, such as beverage cases, on the pallets in the warehouse so that the articles may be removed one column at a time versus one layer at a time. While this practice provides sufficient space to place empty containers on a pallet prior to and during the delivery of the stacked items, fewer pallets of beverage cases are capable of being stacked on top of one another due to the instability of a column stacked load versus a pattern tier stacked load. This column stacking practice is undesirable and results in a decreased warehouse efficiency. Moreover, the empty containers that are column stacked are also less stable than those that are pattern stacked by tiers.

This results in considerably more bottle breakage during plant handling of the pallets.

In order to provide an increased number of product separation areas in a bay body, another practice has been to use permanent shelves which are available on the market to fit into a bay, dividing it into a plurality of fixed storage areas. These shelves usually can be folded back against the back wall of the bay when not in use and can be placed at a limited number of fixed locations within the bay. However, once articles have been placed on the shelf, the shelf cannot be moved or adjustably positioned within the bay of the truck body without unloading the articles and reinstalling the shelf at another fixed location within the bay. This creates a problem during the delivery route when different type and size articles are encountered for return to the plant. This apparatus has other disadvantages in that the predetermined and fixed division of the bay prohibits placing or removing a complete and full pallet load of stacked articles into or from the bay without taking it apart and stacking the articles individually by hand.

Accordingly, there has arisen a need in the industry for the production of a movable shelf apparatus, preferably of simple construction, capable of being adjustably positioned quickly at all times during the distrubution route in a permanent location within the bay of the truck or trailer body for article separation purposes, to accommodate packages of different types and sizes and for supporting, handling and transporting stacked articles during transit from manufacturing points to sales points.

OBJECTS OF INVENTION

The principal object of the present invention is to provide a movable shelf apparatus for dividing a bay in a truck or trailer body into adjustable proportions, which arrangement includes a load supporting shelf that may be permanently positioned or utilized at any time during transit at any position in the bay of a truck or trailer body.

Another object is to provide a load supporting shelf which when mechanically activated or otherwise adjustably positioned within the bay of a truck, maintains a relative position within an A-frame body parallel to the base of th bay and perpendicular to the back bay wall so as to incline the stacked articles towards the center of the body to minimize slippage of articles during transit.

Another object is to provide a mechanism for supporting and elevating a load supporting shelf within a bay so as not to interfere or otherwise obstruct the expeditious loading and unloading of stacked articles on pallets that are supported on the shelf and/or in the bay itself by means of a conventional pallet forklift.

Another object is to provide a means of lowering or elevating a shelf of both mechanical and manual operation which shall provide maximum simplicity and economy of manufacture and simplicity and reliability in operation.

Another object is to provide a flexible means of separating at least two different types of articles that are normally encountered in route delivery, wherein the first is loaded out and at each stop a portion of the first is off loaded and some of the second is picked up, such as where full cases of beverage are delivered and cases of empty glass are picked up.

Another object is to provide a truck or trailer body with a movable shelf apparatus which is protected from normal road hazards such as dirt and gravel and from broken glass at the bottom of each bay.

A further object is to provide each bay of a truck body with an independent means for activating individual shelf movement within each bay and wherein said means are permanently attached to each bay to enable each bay to be divided into adjustable proportions.

A still further object is to provide a means of locking the movement of the shelf at any position to prohibit movement of the shelf during transit. These, other, and further objects, important features, and advantages of the present invention to which attention has not specifically been directed hereinabove, will be better understood and appreciated by those skilled in the art from the following detailed description of the invention taken in conjunction with the accompanying drawings.

SUMMARY OF THE INVENTION

We have discovered that a movable shelf apparatus located in one or more bays of a truck or trailer body offer significant advantages not otherwise available in current route delivery equipment designed for transporting stacked articles on pallets.

For example, by raising the shelf of the present invention to the uppermost limit of travel, a full pallet load of stacked articles may be placed in the area of the bay underneath the shelf by a forklift. As the cases of articles (in terms of the beverage industry) are removed from the pallet for delivery, the shelf can be lowered in the available space thus created, providing room for the empty containers to be returned and stored on the load supporting shelf. Furthermore, by placing an empty pallet on the shelf during the loading operation, the empty containers can be stacked on the pallet during route delivery in a most efficient manner and later unloaded by a forklift without a rehandling requirement.

As more cases of articles are delivered, more space is created in the bay so that the shelf can be lowered further, thus providing an increased amount of space for returned empty containers. As the number of returned empty containers rarely exceeds the number of cases to be delivered, there is generally always a sufficient amount of space on the shelf on which to place empty containers because the space on the shelf is inversely proportional to the number of cases of articles remaining on the pallet underneath the shelf.

Four movable shelf arrangements in one truck body (one arrangement per truck bay) offer four different pallets on which to place containers to be returned, thus allowing initial product separation of up to four different types or sizes of containers. This substantially minimizes the rehandling difficulties presently required in conventional vehicles in order to return empty containers to the bottling plant sorted by size.

It should be apparent from the foregoing that the present invention has many advantages over conventional article handling and distribution equipment. THe movable shelf apparatus of the present invention allows complete article separation within the same bay of cases to be delivered from those empty containers that are picked up. It provides optimum interaction with forklift loading and unloading of pallet bay delivery bodies by allowing a full pallet of cases of full product to be placed in the bay at the start of a delivery route and a full pallet of empties to be removed from the same bay at the completion of the delivery route. By minimizing the restacking and rehandling requirements of cases presently necessary, the present invention reduces deliveryman fatigue, shortens delivery times and thereby reduces attendant delivery costs. Movable shelves also allow pattern tier stacking of cases to be delivered, as well as empty containers to be returned (without rehandling), thereby increasing warehouse efficiency and reducing bottle or package breakage. By allowing cases to be delivered and empty containers to be worked efficiently in the same bay, movable shelves allow increased delivery capacities on conventional delivery bodies by eliminating the normal procedure of leaving open one or more bays for the initial collection of empty containers. Furthermore, the present invention allows existing loads to be spread out among more bays for increased route capacity.

BRIEF DESCRIPTION OF DRAWING

The present invention will now be described, by way of example, with reference to the accompanying drawings, in which.

DETAILED DESCRIPTION OF INVENTION

Figure 1:
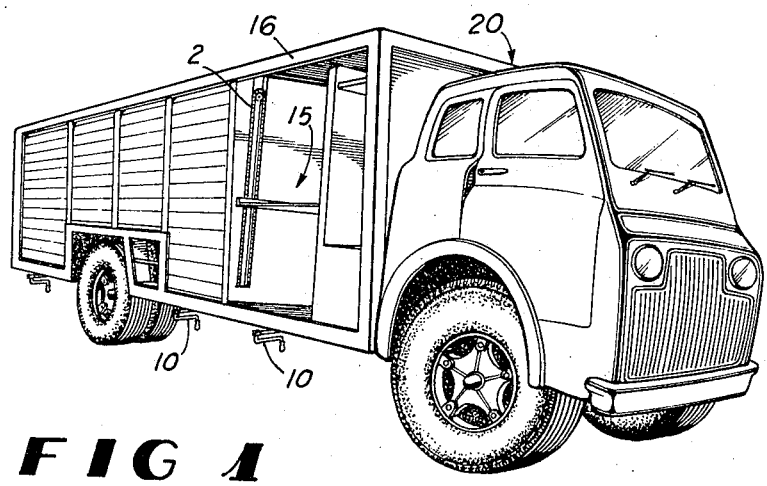
FIG. 1 is a fragmentary side elevational view of a truck body embodying the principles of the present invention.
Figure 2:
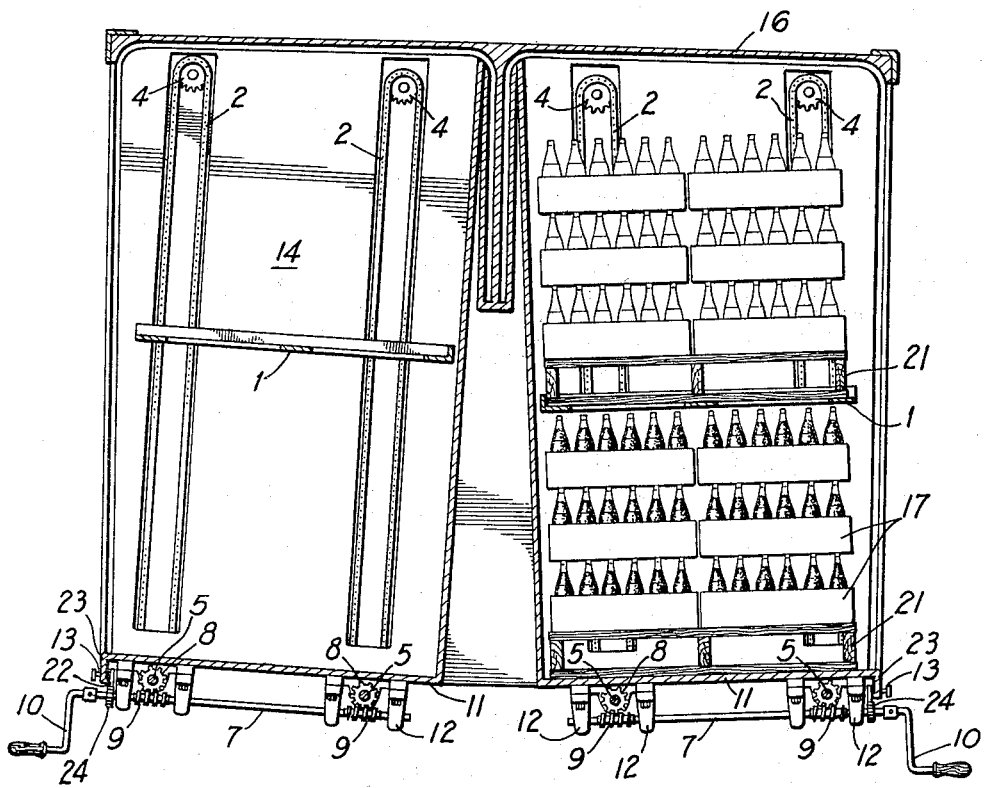
FIG. 2 is a vertical, transverse sectional view through the truck body, taken along line 1—1 in FIG. 1 and additionally including stacked cases of bottles (full and empties)
Figure 3:
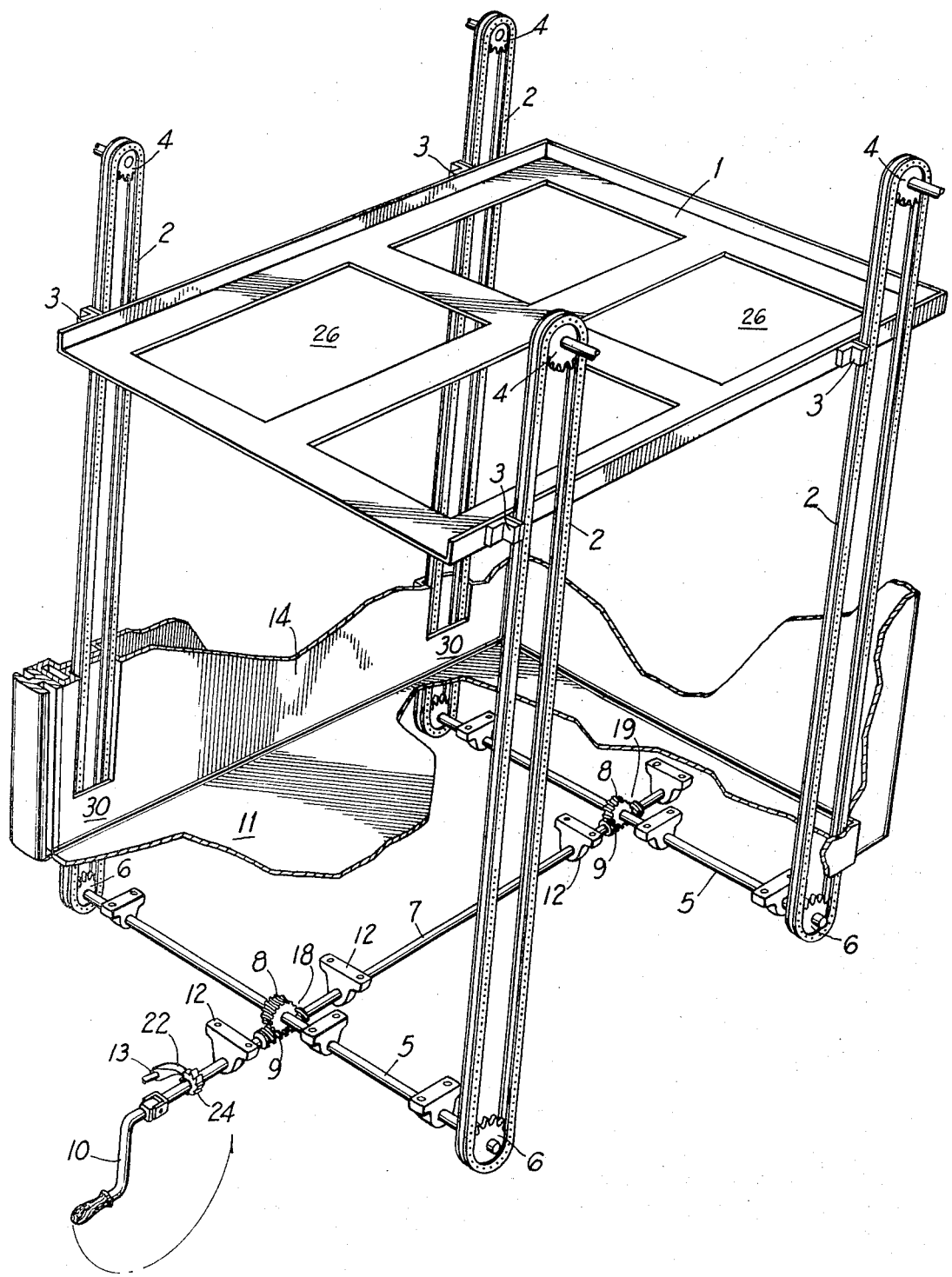
FIG. 3 is a fragmentary perspective of the movable shelf arrangement of the present invention, portions being broken way for simplicity of illustration.
Figure 10:
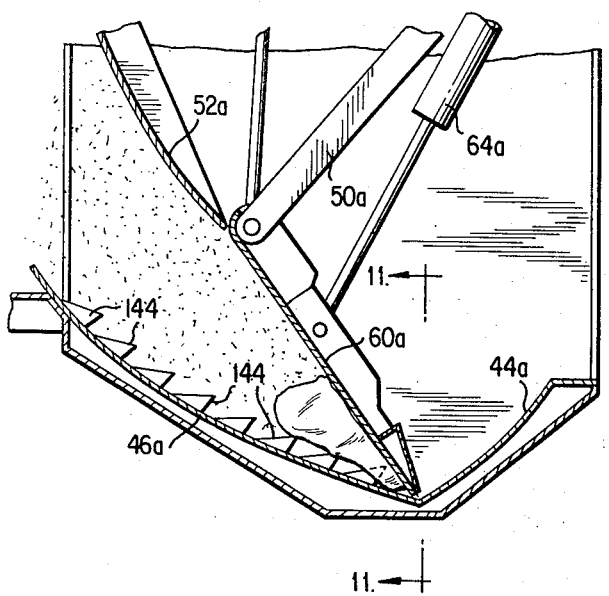
Figure 11:
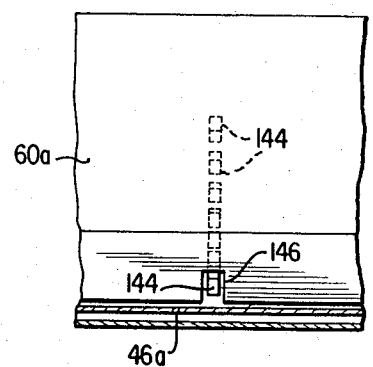

Referring to the drawing in detail and more particularly FIGS. 1-3, a truck body 20 will be seen incorporating the present invention. A movable shelf 1 is diagrammatically illustrated as being supported by four roller chains 2, each connected to the shelf 1 by an attaching link and bracket member 3 forming four complete chain loops from the top to the bottom of the bay wall portions 14 of the truck 20.

These chains 2 are recessed within the divider bay walls 14 of a truck or trailer body 20, so as not to obstruct pallet 21 movement into and out of a bay 15. The nature of the extension, reinforcement and modification to the divider walls 14 and body frames 16 themselves varies according to each individual body manufacturer. The chains 2 each form a continuous loop from a top sprocket 4 to a corresponding bottom sprocket 6. The four top idler sprockets 4 hold and support the shelf 1 load, which if fully loaded with cases of beverages 17, could approximate one ton. The four idler sprockets 4 are adjustable in order to more evenly distribute the elevating force between the four chains 2. Each idler sprocket 4 is independently supported, usually by an extension of the body frame 16 within the two walls 14 of a bay divider.

Vertical motion of the shelf 1 is accomplished through rotation of two parallel cross shafts 5 connected to the chain loops 2 by four driving sprockets 6. Rotation of the cross shafts 5 is accomplished by the rotation of a drive shaft 7 located at a point midway between the two ends of the cross shafts 5 and connected to the cross shafts 5 by a worm 9 and worm gear 8 arrangement at each of the two points of intersection 18 and 19 between the three shafts. The worm 9 and worm gear 8 mechanism prevents the free fall of the shelf 1 under normal operations.

The drive shaft 7 can be rotated in either direction by means of a crank handle 10 permanently attached to the outer end of the shaft 7, which crank handle can be folded underneath the shaft 7 (as illustrated in FIG. 1) and secured under the truck floor line 11 so as not to extend past the outermost widthwise dimension of the truck body 20.

As shown in FIG. 3, the activating mechanisms for the shelf are located beneath the compartment floor 11 and each shaft is supported from the bottom of the bay floor 11 by means of pillow block bearings 12 that are secured by any conventional manner to the floor 11.

During transit, the shelf 1 is permanently positioned by means of a ratchet shaft release mechanism 13 located between the body and the drive shaft 7 so as to prohibit drive shaft 7 rotation in one direction. THis ratchet shaft release mechanism 13 in the preferred embodiment comprises a conventional spring loaded bar 22 (FIG. 2) which when released, engages itself between the teeth of the ratchet gear 24 located on the drive shaft 7 so as to only allow rotation of the shaft in one direction. The bar 22 can be held away from the ratchet gear 24 by a similar rotatable bar affixed to the bottom edge 23 of the body acting as a wedge between the spring loaded bar and the gear.

The shelf 1 itself is so structured out of flat stock and angle iron so as to provide a three-sided body designed for the support of a pallet (see FIG. 3). The open areas 26 within the shelf 1 not only reduce the weight but discourage the placement of stackable articles such as beverage cases on the shelf without prior placement of a pallet 21. The shelf 1 (as shown in FIG. 2) is also attached to the roller chains 2 in such an inclined position as to be at all times parallel to the inclined bay floor 26 and perpendicular to the bay walls 14.

The inclining of the pallets 21 and the cases of articles borne thereby and the leaning of the loads inwardly towards the center of the truck body 20 dependably maintains the pallets 21 and load on the truck during transportation without any auxiliary load securing means. Jostling and vibration during transportation tends securely to maintain the loads on the truck because of the inwardly sloped bay floors 26. The right-angular relationship of the bay walls 14 to the bay floors 26 maintains the cases of bottles beverages 17 or other articles in original stacked relation on the pallets 21 so that the pallets 21 and their loads 17 may be conveniently removed by a power operated forklift truck (not shown) by inserting the forks into the channel portions of the pallets 21, raising the forks to return the pallet to a horizontal position and the stacked articles to an erect stacked position thereon, further elevating the forks to clear the pallets 21 from the bay floors 26, and thence conveying the removed pallet 21 and stacked articles to any desired depositing position.

Those portions of FIGS. 2 and 3 shown to be below the compartment floor line 11, except for the folding crank handle 1 and ratchet shaft release 13, are protected from outside elements encountered in transit, such as rocks, mud, and gravel by a detachable steel pan (not shown) which fits over these parts and may be secured to the bottomside of the bay floor 11 by any conventional manner. Likewise within the bay 15, the bottommost 6 inches of chain exposure for each chain 2 is covered by a plate steel portion 30 to prevent accumulated trash and broken glass from becoming caught between the roller chains 2 and the drive sprockets 6. These steel portions 30 (shown in FIG. 3 as an integral part of bay divider wall 14) also inherently prevent the lowering of the shelf 1 to a position less than the height of a pallet 21 from the floor 11 of the bay 15. Since bay bodies are normally constructed for the express purpose of handling stacked articles on pallets, there is little reason for the shelf 1 to be lowered completely into contact with the bay floor 11.

It should be manifest that while a preferred embodiment of the present invention has been shown and described for illustrative purposes, the present invention is capable of wide variation. For example, instead of a truck body, the present invention is capable of being incorporated in a trailer body or any other vehicle having bay compartments for supporting, handling and transporting stacked articles during transit from manufacturing points to sales points. Also, while the preferred embodiment illustrates cases of bottles, it should be understood that the movable shelf apparatus of the present invention may be used for supporting, handling and transporting any type or size of articles and is not to be limited to bottled beverages. Also, while the preferred embodiment utilizes a crank handle arrangement for activating the shelf movement, it should be understood that any commonly used motor means could be used in lieu of the manual activation (crank handle arrangement), whether it be electric, pneumatic or hydraulic. Moreover, while the shelf is illustrated as having an opening therein to discourage the stacking of bottled beverages without a pallet on the shelf, the shelf could instead be formed as a solid sheet where appropriate.

It is believed that the present invention, its mode of construction, assembly and operation, and many of its advantages attendant thereto should be readily understood from the foregoing without further description and it should also be manifest that, while a preferred embodiment of the invention has been shown and described for illustrative purposes, the structural details are nevertheless capable of wide variation within the purview of the invention as defined in the appended claims.

The embodiment of the invention in which an exclusive property right or privilege is claimed are defined as follows:

1. A vehicle having an A-frame body and a plurality of bay portions on opposite sides of the longitudinal center of said vehicle for the transportation of stacked articles on pallet members within the bay portions, each bay portion including a back bay wall and a pair of spaced divider walls shelf means provided in each bay portion of the vehicle so as to divide the bay into adjustable proportions and wherein different sizes of stacked articles may be supported, handled and transported by said shelf means, said shelf means being maintained during its vertical movement in a relative position within the bay of said A-frame body vehicle so as to be parallel to the bay compartment floor and perpendicular to the back bay wall, said shelf means being inclined towards the center of the vehicle body to minimize slippage of articles during transit, and elevating means provided in association with the bay divider walls for permanently positioning the shelf means at any location during its vertical movement in the bay portion, and activating means provided for applying a torque to the elevating means.

2. A vehicle as defined in claim 1, wherein independent elevating means and activating means is associated with each shelf means so as to enable each bay to be divided into adjustable proportions for article separation purposes upon the independent operation of each respective activating means.

3. A vehicle, as defined in claim 14, wherein the activating means comprises a motor means for applying the torque to the elevating means.

4. A vehicle, as defined in claim 1, wherein the elevating means comprises an adjustable support means on the bay divider walls and attached to opposite sides of the shelf and wherein the activating means are positioned beneath the bay compartment floors.

5. A vehicle as defined in claim 4, wherein the adjustable support means comprises a pair of chains, each chain being connected to the shelf by an attaching link and bracket member, said chains forming a continuous loop between upper and lower corresponding sprocket members that are in turn interconnected through the activating means for vertical movement of the shelf, all of said chains and sprocket members being recessed into the bay divider walls so as not to interfere or otherwise obstruct the expeditious loading and unloading of the stacked articles on pallets by a pallet forklift.

6. A vehicle as defined in claim 5, wherein:
    A pair of parallel cross shafts are interconnected to the chains through the sprocket members, and wherein the cross shafts are connected together by a drive shaft which is located at a point between the two ends of each cross shaft and which is connected to the cross shafts by virtue of a worm and worm gear mechanism.

7. A vehicle as defined in claim 6, wherein a crank handle means are connected to the drive shaft for mechanically activating the elevating means, and further wherein a ratchet shaft release mechanism is associated with a ratchet gear on the drive shaft so as to only allow rotation of the drive shaft in one direction.

8. A vehicle as defined in claim 4, wherein the adjustable support means comprises four chains, each chain being connected to one of the four respective corners of the shelf means by an attaching link and bracket member, said chains forming four continuous loops between upper and lower corresponding sprocket members that are in turn interconnected through the activating mean for vertical movement of the shelf within said bay.

9. A vehicle as defined in claim 18, wherein: a pair of parallel cross shafts are interconnected to the chains through the sprocket members, and wherein the cross shafts are connected together by a drive shaft which is located at a point between the two ends of each cross shaft and which is connected to the cross shafts by virtue of a worm and worm gear mechanism.

10. A vehicle having a plurality of bay portions on opposite sides of the longitudinal center of said vehicle for the transportation of stacked articles on pallet members within the bay portions, each bay portion including a back bay wall and a pair of spaced divider walls shelf means provided in each bay portion of the vehicle so as to divide the bay into adjustable proportions and wherein different sizes of stacked articles may be supported, handled and transported by said shelf means, said shelf means being maintained during its vertical movement in a relative position within the bay of said vehicle between the bay divider walls so as to be parallel to the bay compartment floor and perpendicular to the bay divider walls and back bay wall, said back bay wall being inclined towards the longitudinal center of the vehicle body, and elevating means provided in association with the bay divider walls for permanently positioning the shelf means at any desired location during its vertical movement in the bay portion, and activating means provided for applying a torque to the elevating means.

11. A vehicle as defined in claim 10, wherein the elevating means comprises a pair of chains, each chain being connected to the shelf means by an attaching link and bracket member, said chains forming a continuous loop between upper and lower corresponding sprocket members that are in turn interconnected through the activating means for vertical movement of the shelf means, all of said chains and sprocket members being recessed into the bay divider walls so as not to interfere or otherwise obstruct the expeditious loading and unloading of the stacked articles on pallets by a pallet forklift.

* * * * *

UNITED STATES PATENT OFFICE
CERTIFICATE OF CORRECTION

Patent No. 3,786,947      Dated January 22, 1974

Inventor(s) James Pressley Craft, III

It is certified that error appears in the above-identified patent and that said Letters Patent are hereby corrected as shown below:

Cancel the sheet of drawing which reads "Sheet 3 of 3". "Sheet 1 of 3 and Sheet 2 of 3" should read -- Sheet 1 of 2 -- and -- Sheet 2 of 2 --, respectively.

Signed and sealed this 24th day of September 1974.

(SEAL)
Attest:

McCOY M. GIBSON JR.
Attesting Officer

C. MARSHALL DANN
Commissioner of Patents